Jan. 25, 1927.
R. A. SMITH
1,615,814
CLUTCH
Filed April 20, 1921
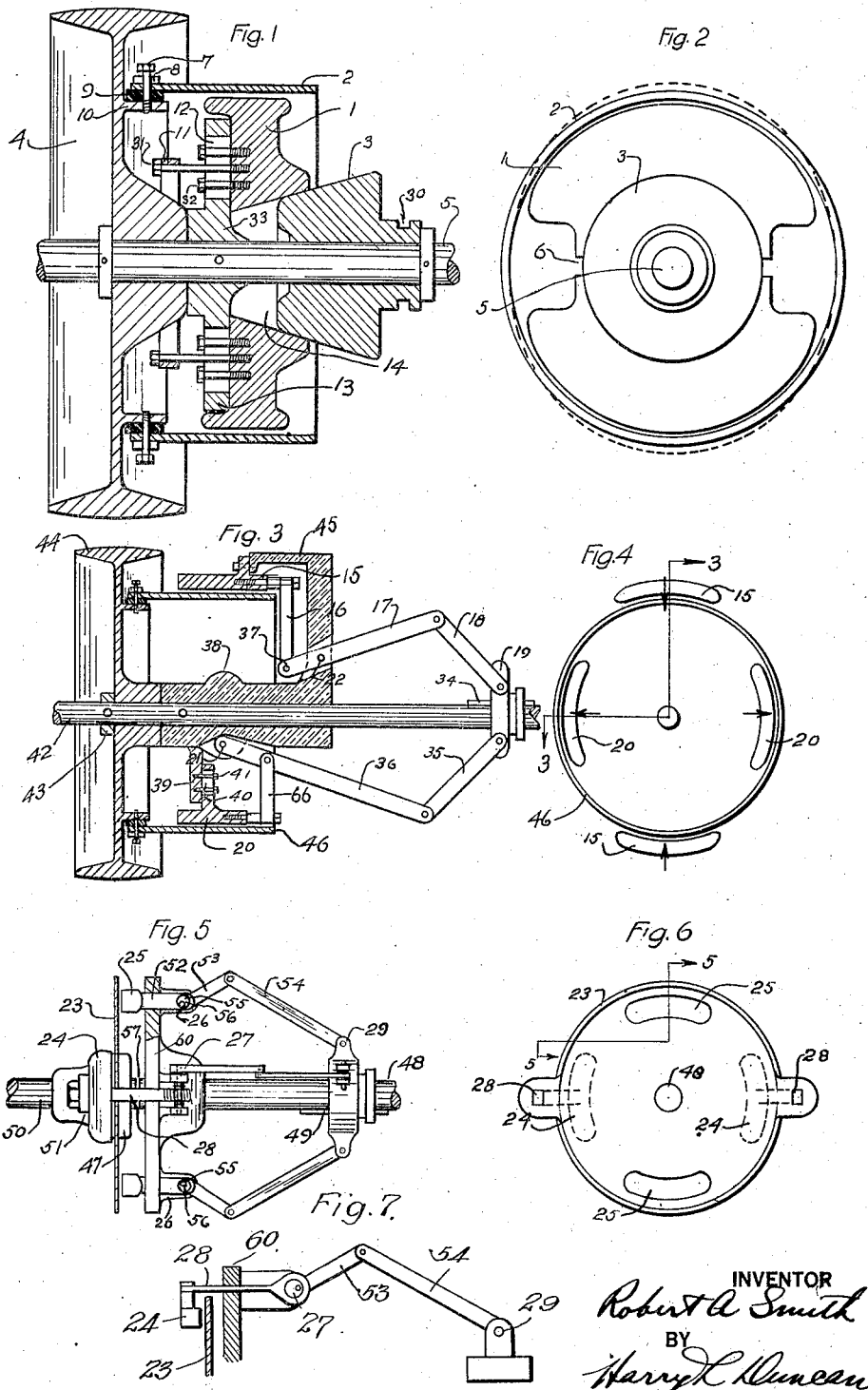
INVENTOR
Robert A. Smith
BY
Harry L. Duncan
ATTORNEY Patented Jan. 25, 1927.

1,615,814

UNITED STATES PATENT OFFICE.

ROBERT A. SMITH, OF MAHWAH, NEW JERSEY, ASSIGNOR TO SMITH & SERRELL, OF NEWARK, NEW JERSEY, A COPARTNERSHIP CONSISTING OF JOHN J. SERRELL, OF ELIZABETH, NEW JERSEY, AND MYSELF.

CLUTCH.

Application filed April 20, 1921. Serial No. 462,875.

This invention relates especially to clutches comprising a resilient clutch member with which clutch elements or shoes cooperate, so as to transversely deform the clutch member when the parts engage. The clutch elements may be in the form of clutch shoes carried by a cooperating clutch member, which may comprise operating connections to bring the clutch elements or shoes into engagement with the clutch member, so that any further relative rotation effects the progressive transverse deformation of the clutch member and thus creates relatively large resistance to slip. It is sometimes desirable to have the resilient clutch member in cylindrical form and mounted so that its parts may be radially displaced. The clutch shoes may engage one or both of the cylindrical peripheries of the clutch member, so as to cause frictional resistance and simultaneous radial deformation of the clutch member when the shoes are fully actuated. In this way the resistance may be made so great as to cause an almost positive clutching action if desired.

In the accompanying drawing showing in a somewhat diagrammatic way illustrative embodiments of the invention—

Fig. 1 is a longitudinal section through an illustrative clutch; and

Fig. 2 is an end view thereof.

Fig. 3 is a longitudinal section through another clutch device taken substantially along the line 3—3 of Fig. 4; and Fig. 4 is a diagrammatic end view thereof.

Fig. 5 is a side elevation of another illustrative clutch parts being shown in section along the line 5—5 of Fig. 6; and Fig. 6 is a diagrammatic end view.

Fig. 7 is a part detail view of the outside toggle eccentric connection in Fig. 5.

In the illustrative arrangement shown in Figs. 1 and 2, the loose pulley 4 may be mounted on the shaft 5 and may have mounted thereon in any suitable way the thin cylindrical clutch member 2 which may be formed of resilient sheet metal such as steel, spring brass etc., a sixteenth or an eighth of an inch in thickness more or less according to the material and service desired. This clutch member may in some cases be mounted to rotate with the pulley or other rotating member while free to move radially with respect thereto, and this may be effected by suitable spring or yielding connections between these parts as by interposing the rubber cushioning gasket 9 between the clutch member 2 and the flange 10 on the pulley. A series of driving bolts 7 may extend through the clutch member and flange so as to insure their rotating together and if desired a stronger connection between these radial driving bolts and the clutch member may be effected by welding or otherwise securing reenforcing members 8 on the clutch member through which the bolts may extend. These reenforcing members may be an eighth to a quarter of an inch thick so as to considerably strengthen these parts of the clutch member, which may be of sixteenth inch spring steel for instance, the thickness of this clutch member 2 being considerably exaggerated in the drawing for the sake of clearness.

Two or more cooperating clutch elements or shoes may engage the inside or outside periphery of the resilient cylindrical clutch member and as indicated two inner clutch shoes 1, may be employed having adjacent their central working faces a curvature corresponding to the normal inner cylindrical surface of the clutch member while their ends may be inwardly relieved or beveled off as indicated in Fig. 2. These shoes may be radially movable and if desired may be mounted on the cooperating clutch member 13, having its center 33 pinned or secured to the shaft 5. Radial slots 12 may be formed in this clutch member through which may extend the bolts 32 fast in the shoes which are thereby guided in their radial movement. If desired also these shoes may be normally retracted by the spring 11 engaging the longer bolts 31 in the shoes. Any suitable actuating means may be employed such as the clutch cone 3 to force the shoes out radially when desired, and of course a suitable shifter lever or fork may engage the recess 30 in the end of the cone so as to force this cone inward toward the clutch member and thereby wedge the shoes radially outward into contact with the cylindrical clutch member. A light pressure on the operating connections causes frictional engagement between these parts while further actuating movement of the shoes forces them out radially into contact with the opposite portions of the clutch ring or cylindrical member, so as to cause its deformation so that it may assume some such elliptical contour as is indicated in the dotted lines in Fig. 2. Even a sixteenth or an eighth of an inch distortion of this kind causes a greatly increased resistance to slip between the clutch members since any further angular movement between them gives rise to a progressive deformation of this resilient clutch member, and of course this deformation may without serious injury to the device be carried sufficiently to practically prevent any substantial slip.

Figs. 3 and 4 show another arrangement in which the loose pulley 44 carries the resilient cylindrical clutch member 46 in any suitable way so that they can revolve around the shaft 42, and are held against longitudinal movement thereon as by the collar 43. As is shown diagrammatically in Fig. 4, two inner clutch shoes or elements 20 may be employed to engage the inner periphery of the clutch member diametrically at opposite points, while if desired two outer clutch shoes or elements such as 15, may be used in addition to or instead of these inner elements. When both outer and inner clutch shoes are simultaneously forced against the cylindrical clutch member by any suitable operating connections, a primary frictional engagement may be effected and then on further actuation of the shoes a more definite radial deformation of the resilient clutch member to give still greater resistance to slip and a correspondingly positive grip or engagement. The clutch shoes or elements may be mounted on the cooperating clutch member such as 38 pinned or secured to the shaft and carrying radial projections 39 in which may be mounted guide bolts 41 passing through suitable slots 40 in the shanks or inward extensions of the shoes 20. These inner clutch shoes may be simultaneously operated by a toggle joint arrangement comprising the shifter collar 19 sliding on the shaft over the key 34 and carrying sets of toggle lengths 35 pivoted to the toggle levers 36, the inner ends of which may be pivoted as by the pins 21 to the cooperating clutch member 38. Suitable links 66 may be pivoted to these toggle levers and to the clutch shoes, so as to force them radially outward when the shifter collar is moved along the shaft. The corresponding outer clutch shoes 15 may be mounted for radial movement and supported in the bracket 45 on the cooperating clutch member, so that they are drawn powerfully inward when the shifter collar is operated. The toggle connections in this case may comprise the links 18, toggle levers 17, swinging about their pins 22 and connected by the pins 37 to each one of the connector links 16 bolted or otherwise connected to the shoes 15.

The illustrative arrangement shown in Figs. 5, 6 and 7 comprises a resilient disc form of clutch member 23, which may be mounted on the shaft section 50 as by being clamped between the collars 47 and 51. This disc may be engaged on one side at two or more separated points by clutch shoes or elements 24, while the clutch shoes 25 may be simultaneously forced against the other side of the disc at intermediate points around its periphery through any suitable or desired operating connections. As is shown somewhat diagrammatically the clutch shoes 24, 25 are slidingly mounted in the cooperating clutch member 60, which may be pinned or secured to the shaft section 48 in any suitable way. The shoes 25 may have stems 52 sliding in apertures in this clutch member 60 and forced against the disc by any suitable toggle connections for example, which may comprise the shifter collar 29 and toggle links 54 pivoted to the toggle arms 53. These toggle arms may be connected to the rocking shafts 56 mounted in the bearing ears or lugs 26 and carrying the eccentrics 55 with which the apertured ends of the stems 52 engage, so that these shoes are forced out against the clutch disc when the toggle arms are swung outward into more nearly radial position. As shown in Fig. 7 the other clutch shoes 24 may have their stems 28 extend through suitable slots in the cooperating clutch member 60 and may be actuated by a generally similar toggle arm eccentric connection, which however, draws these clutch shoes inward against the clutch disc while the clutch shoes 25 are pushed against the opposite face of the disc at intermediate points. A frictional clutching action on the disc is thus secured by the first contact while further and more energetical contact causes a transverse deformation which greatly increases the clutching engagement or resistance to slip between the clutch members, so that the shafts rotate together without substantial slip until the clutch is released.

This invention has been described in connection with a number of illustrative embodiments, forms, shapes, proportions, sizes, materials, and arrangements, to the details of which disclosure the invention is not of course to be limited, since what is claimed as new and what is desired to be secured by Letters Patent is set forth in the appended claims.

I claim:

1. In clutches a thin resilient cylindrical clutch member yieldingly mounted to rotate while its radial displacement is permitted, cooperating inner clutch shoes arranged to engage said clutch member at separated points around its inner periphery, and having the central portions of their working faces of substantially the same curvature as the clutch member with which they engage, cooperating outer clutch shoes arranged to engage said clutch member at intermediate points around its outer periphery, a cooperating clutch member carrying said clutch shoes and operating connections on said cooperating clutch member to force said inner clutch shoes outward and said outer shoes inward into frictional engagement with said resilient clutch member and to further actuate said clutch shoes to effect the progressive radial deformation of said clutch member during any further relative rotation of the cooperating clutch member and increase the driving engagement between the clutch members.

2. In clutches a thin resilient cylindrical clutch member mounted to rotate, cooperating inner clutch shoes arranged to engage said clutch member at separated points around its inner periphery, cooperating outer clutch shoes arranged to engage said clutch member at intermediate points around its outer periphery, a cooperating clutch member carrying said clutch shoes and operating connections on said cooperating clutch member to force said inner clutch shoes outward and said outer shoes inward into frictional engagement with said resilient clutch member and to further actuate said clutch shoes to effect the progressive radial deformation of said clutch member during any further relative rotation of the cooperating clutch member.

3. In clutches a thin resilient sheet metal cylindrical clutch member, cooperating inner clutch elements arranged to engage said clutch member at separated points around its inner periphery, cooperating outer clutch elements arranged to engage said clutch member at intermediate points around its outer periphery, a cooperating clutch member carrying said clutch elements and operating connections on said cooperating clutch member to force said inner clutch elements outward and said outer clutch elements inward into frictional engagement with said resilient clutch member and to effect the progressive radial deformation of said clutch member during any further relative rotation of the cooperating clutch member and correspondingly increase the resistance to slip between the clutch members.

4. In clutches a resilient cylindical clutch member, cooperating inner clutch elements arranged to engage said clutch member at separated points around its inner periphery, cooperating outer clutch elements arranged to engage said clutch member at intermediate points around its outer periphery, a cooperating clutch member carrying said clutch elements and operating connections on said cooperating clutch member to force said inner clutch elements outward and said outer clutch elements inward into engagement with said resilient clutch member and to effect the progressive radial deformation of said clutch member during any further relative rotation of the cooperating clutch member and correspondingly increase the resistance to slip between the clutch members.

5. In clutches a thin resilient sheet metal clutch member mounted to rotate, cooperating clutch shoes arranged to engage said clutch member at separated points around its periphery, cooperating opposing clutch shoes arranged to engage the other side of said clutch member at intermediate points around its periphery, a cooperating clutch member carrying said clutch shoes and operating connections on said cooperating clutch member to force said clutch shoes into frictional engagement with said resilient clutch member and to further actuate said clutch shoes to effect the progressive deformation of said clutch member during any further relative rotation of the cooperating clutch member and increase the driving engagement between the clutch members.

6. In clutches a resilient clutch member mounted to rotate, cooperating clutch shoes arranged to engage said clutch member at separated points around its periphery, cooperating opposing clutch shoes arranged to engage the other side of said clutch member at intermediate points around its periphery, a cooperating clutch member carrying said clutch shoes and operating connections on said cooperating clutch member to force said clutch shoes into deforming engagement with said resilient clutch member.

7. In clutches a thin resilient cylindrical clutch member yieldingly mounted to rotate, cooperating inner clutch shoes arranged to frictionally engage said clutch member at separated substantially diametrically opposite points, a cooperating clutch member carrying said clutch shoes and operating connections on said cooperating clutch member to force said clutch shoes outward into frictional engagement with said resilient clutch member and to further actuate said clutch shoes to effect the progressive substantially symmetrical radial deformation of said resilient clutch member to an amount readily observed by the naked eye to increase the driving engagement and finally prevent substantial slip between the clutch members.

ROBERT A. SMITH.